(12) United States Patent
Kim et al.

(10) Patent No.: US 7,553,256 B2
(45) Date of Patent: Jun. 30, 2009

(54) HYDRAULIC CONTROL APPARATUS FOR BELT-DRIVE CVT OF VEHICLE

(75) Inventors: Jonggap Kim, Kanagawa (JP); Yasushi Yabe, Shizuoka (JP)

(73) Assignee: JATCO Ltd, Shizuoka (JP)

( * ) Notice: Subject to any disclaimer, the term of this patent is extended or adjusted under 35 U.S.C. 154(b) by 436 days.

(21) Appl. No.: 11/487,365

(22) Filed: Jul. 17, 2006

(65) Prior Publication Data

US 2007/0060441 A1    Mar. 15, 2007

(30) Foreign Application Priority Data

Sep. 7, 2005    (JP)    ............................. 2005-259205

(51) Int. Cl.
F16H 61/662    (2006.01)
F16H 61/02    (2006.01)
F16H 51/64    (2006.01)
G06F 7/00    (2006.01)

(52) U.S. Cl. .............................. 477/46; 477/49; 477/98; 701/60

(58) Field of Classification Search ................... 477/98, 477/44, 45, 46, 48, 49; 701/60, 61
See application file for complete search history.

(56) References Cited

U.S. PATENT DOCUMENTS 4,761,153 A * 8/1988 Morimoto .................... 474/28
6,098,001 A * 8/2000 Yuasa .......................... 701/51
6,533,702 B1 * 3/2003 Asyama et al. ............... 477/45
7,435,200 B2 * 10/2008 Kim et al. .................... 477/46

FOREIGN PATENT DOCUMENTS

JP    5-131295 A    5/1993

* cited by examiner

*Primary Examiner*—Roger Pang
(74) *Attorney, Agent, or Firm*—Foley & Lardner LLP

(57) ABSTRACT

A hydraulic control apparatus of a belt-drive CVT, controlling a transmission ratio by changing respective effective rotation radii of driving and driven pulleys, includes vehicle information sensors; hydraulic actuators changing the respective rotation radii; and a control unit determining each fluid pressure command value provided for the pulleys, and controlling the hydraulic actuators based on the fluid pressure command values. The control unit acquires an actual displacement amount of one of the pulleys. When changing a transmission to the highest or lowest speed transmission, the control unit sets a target displacement amount of one of the pulleys; estimates a rapidly changing amount of the working fluid pressure, occurring at close to an end of the speed change; and corrects the fluid pressure command value by the rapidly changing amount at a time when a rate of the actual displacement amount with respect to the target displacement amount has reached a predetermined rate $\alpha_0$.

9 Claims, 5 Drawing Sheets

HYDRAULIC CONTROL APPARATUS FOR BELT-DRIVE CVT OF VEHICLE

BACKGROUND OF THE INVENTION

The present invention relates to a hydraulic control apparatus for a belt-drive CVT (continuously variable transmission) of a vehicle, which continuously changes a transmission ratio by way of controlling a separation between the two sides of each of the drive and driven pulleys by working fluid pressure.

The belt-drive CVT is provided with a primary pulley (drive side pulley), a secondary pulley (driven side pulley) and a belt (V-belt) wound around the both primary and secondary pulleys. Each of the primary and secondary pulleys is formed from a stationary sheave (pulley) which is integrally formed with a shaft (a primary shaft or a secondary shaft) as an axis of rotation, and a movable sheave (a slide pulley) that is movable in an axial direction of the shaft. These stationary and movable sheaves are coaxially aligned with each other, and facing to each other. And the belt is pressed between a V-shaped groove formed by the stationary and movable sheaves, then power is transmitted from the primary pulley to the secondary pulley.

Each of the movable sheaves of the primary and secondary pulleys is movable in the axial direction of the shaft so that the movable sheave separates from the stationary sheave or moves closer to the stationary sheave, by controlling fluid pressure in a fluid pressure chamber formed behind the movable sheave. Further, by way of this movement (stroke displacement) of the movable sheave, a width of the groove is adjusted. Thus, effective radius of rotation of the pulley is adjusted, and therefore a power transmission ratio from the drive side pulley to the driven side pulley is continuously varied.

For instance, when setting the transmission ratio to small (namely, high speed), the groove width of the drive side pulley is decreased by increasing the fluid pressure in the fluid pressure chamber of the drive side pulley and by pushing the movable sheave toward the stationary sheave. And the effective radius of rotation of the belt running around the drive side pulley becomes large. At this time, as a matter of course, since a length of the belt does not change, as the radius of rotation of the drive side pulley becomes large, the radius of rotation of the driven side pulley becomes small. And therefore, the transmission ratio can be set to small.

In the above belt-drive CVT for the vehicle, there may be the following drawback when changing the transmission ratio to maximum (namely, lowest speed) or to minimum (namely, highest speed or top speed). FIG. 5 is an example showing variations in the fluid pressure of the drive and driven side pulleys and the transmission ratio with time in a case where the transmission ratio is set to minimum (highest speed). When an operation of the speed change starts, the working fluid pressure is provided for the fluid pressure chamber of the drive side pulley, and the fluid pressure of the drive side pulley rises rapidly (at T1). Then, after the fluid pressure of the fluid pressure chamber has reached a predetermined fluid pressure, the movable sheave of the drive side pulley is pushed toward the stationary sheave, and the stroke displacement of the drive side pulley is initiated (at T2). As the groove width of the drive side pulley is decreased and the effective rotation radius becomes large with the displacement of the movable sheave, the transmission ratio gradually continuously becomes smaller and finally the highest speed transmission is obtained. Here, as the movable sheave starts moving toward the stationary sheave, the fluid pressure chamber of the drive side pulley is provided with the working fluid by an amount corresponding to an amount of the displacement of the movable sheave. However, at this time, a volume of the fluid pressure chamber increases by a volume corresponding to the amount of the displacement of the movable sheave. As a result of this, the fluid pressure of the drive side pulley increases moderately from T2. After that, when the transmission ratio has reached the minimum ratio (when the highest speed transmission has been obtained) at T3, the movable sheave of the drive side pulley is suddenly stopped by mechanical movement limitation. On the other hand, the working fluid continues flowing into the fluid pressure chamber by inertia. In other words, the flow of the working fluid into fluid pressure chamber does not stop rapidly due to the inertia, and can not respond quickly to the sudden stop of the movable sheave. Accordingly, even though the movable sheave stops due to the mechanical movement limitation and the increase of the volume of fluid pressure chamber also stops, the working fluid continues flowing into the fluid pressure chamber for a while. Therefore, a sharp or sudden increase in fluid pressure occurs at the drive side pulley, and an overshoot of pressure arises.

Meanwhile, as for the driven side pulley, although the movable sheave suddenly stops by mechanical movement limitation in the same manner as the drive side pulley, the working fluid continues flowing out of the fluid pressure chamber of the driven side pulley because of inertia. As a result of this, a sharp or sudden decrease in fluid pressure occurs at the driven side pulley, and an undershoot of pressure arises.

As described above, a phenomenon in which the fluid pressure temporarily rapidly changes is called "a surge pressure". And the surge pressure occurs in a case as well where the transmission ratio is set to maximum (lowest speed) in the same manner as set to minimum (highest speed). In the case of setting of the lowest speed transmission, the fluid pressure chamber of the driven -side pulley is provided with high fluid pressure. And the movable sheave of the driven side pulley is pushed toward the stationary sheave, then the transmission ratio varies by way of changing of effective rotation radius of the driven side pulley. Here, when the transmission ratio has reached the maximum ratio (when the lowest speed transmission has been obtained), the movable sheave of the driven side pulley suddenly stops. However, the flow of the working fluid into fluid pressure chamber of the driven side pulley does not stop rapidly, and can not respond quickly to the sudden stop of the movable sheave. The overshoot therefore arises at the driven side pulley by an excess surge pressure. Meanwhile, as for the drive side pulley, since an outflow of the working fluid can not respond quickly to the sudden stop of the movable sheave, the undershoot arises at the drive side pulley by the surge pressure.

In the above belt-drive CVT, when the excess surge pressure arises, there are possibilities that a load or shock resulting from the surge pressure may cause damage to the bet or reduction in life of the belt. In addition, when the undershoot of the fluid pressure arises at the drive or driven side pulleys, a grasping force which grasps or presses the belt by the fluid pressure might reduce, and there may arise a belt slip causing a pulley racing.

For the above problems, as a means of controlling of such surge pressure, Japanese Patent Provisional Publication No. 5-131295 (hereinafter is referred to as "JP5-131295") shows an apparatus which reduces the surge pressure. In JP5-131295, an opening of a servo valve that regulates fluid pressure is feedback controlled (PID controlled). And the surge pressure is reduced by compensating for or correcting a control gain.

SUMMARY OF THE INVENTION

In the above control apparatus of JP5-131295, however, since the opening of the servo valve is PID controlled, a response delay between when the fluid pressure increase is requested and when the fluid pressure actually increases becomes large. Because of this, if the control apparatus of JP5-131295 is applied to the control for the fluid pressure chamber of drive and driven side pulleys of the belt-drive CVT, the overshoot and undershoot caused by the surge pressure would be reduced. However, a response delay between when a change of the transmission ratio is requested and when the transmission ratio is actually changed, which results from the above response delay of the fluid pressure increase, is large. And further, an interference with transmission feedback control might occur. Accordingly, there may arise a new problem in which the transmission control can not be executed properly.

It is therefore an object of the present invention to provide a hydraulic control apparatus for a belt-drive CVT of a vehicle, in which the speed change of transmission can take place with a good response to the request for the transmission ratio change, and additionally the overshoot and undershoot of the fluid pressure occurring when the transmission ratio is set to maximum or minimum can be prevented.

According to one aspect of the present invention, a hydraulic control apparatus of a belt-drive CVT for a vehicle, controlling a transmission ratio by changing respective effective rotation radii of a belt, linking driving and driven pulleys, by working fluid pressure, comprises vehicle information sensors that detect vehicle information; hydraulic actuators that adjust each displacement position in moving direction of the driving and driven pulleys, and change the respective effective rotation radii of the belt wound around the driving and driven pulleys in accordance with the working fluid pressure; a control unit that determines each fluid pressure command value provided for the driving and driven pulleys based on the vehicle information detected by the vehicle information sensors, and controls the hydraulic actuators responsively to each control command value corresponding to the respective fluid pressure command values; the control unit comprises an actual displacement amount acquisition section that acquires an amount of actual displacement of one of the driving and driven pulleys, and is configured to perform the following when changing speed to a limit of speed change: set an amount of target displacement of one of the driving and driven pulleys based on the vehicle information detected by the vehicle information sensors; estimate a rapidly changing amount of the working fluid pressure, occurring at close to an end of the speed change, from a flowing working fluid quantity of a fluid chamber of the one pulley, which is obtained from the actual displacement amount of the one of the pulleys acquired by the actual displacement amount acquisition section, and a modulus of volume elasticity of the working fluid; and correct the fluid pressure command value by the rapidly changing amount of the working fluid pressure at a time when a rate of the actual displacement amount with respect to the target displacement amount has reached a predetermined rate $\alpha_0$.

According to another aspect of the invention, a hydraulic control apparatus of a belt-drive CVT for a vehicle, controlling a transmission ratio by changing respective effective rotation radii of a belt, linking driving and driven pulleys, by working fluid pressure, comprises: vehicle information sensors that detect vehicle information; hydraulic actuators that adjust each displacement position in moving direction of the driving and driven pulleys, and change the respective effective rotation radii of the belt wound around the driving and driven pulleys in accordance with the working fluid pressure; a control unit that determines each fluid pressure command value provided for the driving and driven pulleys based on the vehicle information detected by the vehicle information sensors, and controls the hydraulic actuators responsively to each control command value corresponding to the respective fluid pressure command values; the control unit comprises: an actual displacement amount acquisition section for acquiring an amount of actual displacement of one of the driving and driven pulleys; a target displacement amount set section for setting an amount of target displacement of one of the driving and driven pulleys based on the vehicle information detected by the vehicle information sensors at a time of speed change to a limit of speed change; a fluid pressure rapidly changing quantity estimate section for estimating a rapidly changing amount of the working fluid pressure, occurring at close to an end of the speed change, from a flowing working fluid quantity of a fluid chamber of the one pulley, which is obtained from the actual displacement amount of the one of the pulleys acquired by the actual displacement amount acquisition section, and a modulus of volume elasticity of the working fluid, at the speed change; and a correction operation section for correcting the fluid pressure command value by the rapidly changing amount of the working fluid pressure at a time when a rate of the actual displacement amount with respect to the target displacement amount has reached a predetermined rate $\alpha_0$, at the speed change.

According to a further aspect of the invention, a hydraulic control apparatus of a belt-drive CVT for a vehicle, controlling a transmission ratio by changing respective effective rotation radii of a belt, linking driving and driven pulleys, by working fluid pressure, comprises: vehicle information sensors that detect vehicle information; hydraulic actuators that adjust each displacement position in moving direction of the driving and driven pulleys, and change the respective effective rotation radii of the belt wound around the driving and driven pulleys in accordance with the working fluid pressure; CVT control means that determines each fluid pressure command value provided for the driving and driven pulleys based on the vehicle information detected by the vehicle information sensors, and controls the hydraulic actuators responsively to each control command value corresponding to the respective fluid pressure command values; the CVT control means comprises: (a) actual displacement amount acquisition means for acquiring an amount of actual displacement of one of the driving and driven pulleys, (b) target displacement amount set means for setting an amount of target displacement of one of the driving and driven pulleys based on the vehicle information detected by the vehicle information sensors, when changing speed to a limit of speed change; (c) fluid pressure rapidly changing quantity estimate means for estimating a rapidly changing amount of the working fluid pressure, occurring at close to an end of the speed change, from a flowing working fluid quantity of a fluid chamber of the one pulley, which is obtained from the actual displacement amount of the one of the pulleys acquired by the actual displacement amount acquisition means, and a modulus of volume elasticity of the working fluid, at the speed change; and (d) surge pressure correction operation means for correcting the fluid pressure command value by the rapidly changing amount of the working fluid pressure at a time when a rate of the actual displacement amount with respect to the target displacement amount has reached a predetermined rate $\alpha_0$, at the speed change.

According to a further aspect of the invention, a method for correcting working fluid pressure provided for each driving and driven pulley, linked to each other by a belt, of a belt-drive CVT employing vehicle information sensors detecting vehicle information, hydraulic actuators changing respective effective rotation radii of the belt wound around the driving and driven pulleys, and a control unit determining fluid pressure command values provided for the driving and driven pulleys based on the detected vehicle information, and controlling the hydraulic actuators based on the fluid pressure command value, the method comprises: acquiring an amount of actual displacement of one of the driving and driven pulleys; setting an amount of target displacement of one of the driving and driven pulleys based on the vehicle information detected by the vehicle information sensors at a time of speed change to a highest speed or a lowest speed; estimating a rapidly changing amount of the working fluid pressure, occurring at close to an end of the speed change, from a flowing working fluid quantity of a fluid chamber of the one pulley, which is obtained from the acquired actual displacement amount of the one of the pulleys, and a modulus of volume elasticity of the working fluid, at the speed change; and correcting the fluid pressure command value by the rapidly changing amount of the working fluid pressure at a time when a rate of the actual displacement amount with respect to the target displacement amount has reached a predetermined rate $\alpha_0$, at the speed change.

The other objects and features of this invention will become understood from the following description with reference to the accompanying drawings.

DETAILED DESCRIPTION OF THE INVENTION

Figure 1:
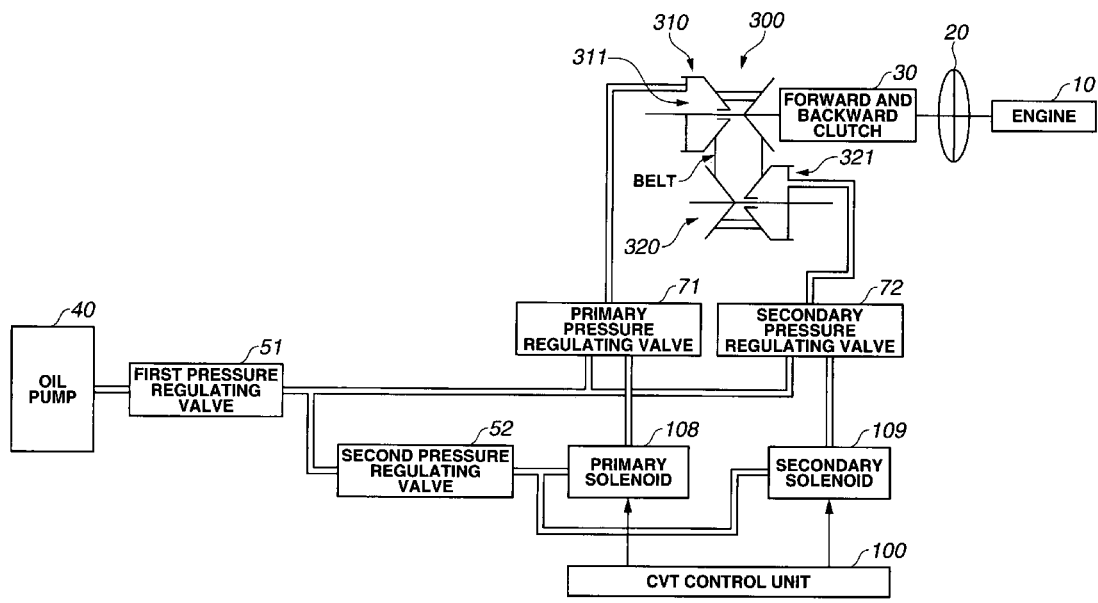
FIG. 1 is a schematic system diagram of a vehicle on which a hydraulic control apparatus of an embodiment according to the present invention for a belt-drive CVT is mounted.
Figure 2:
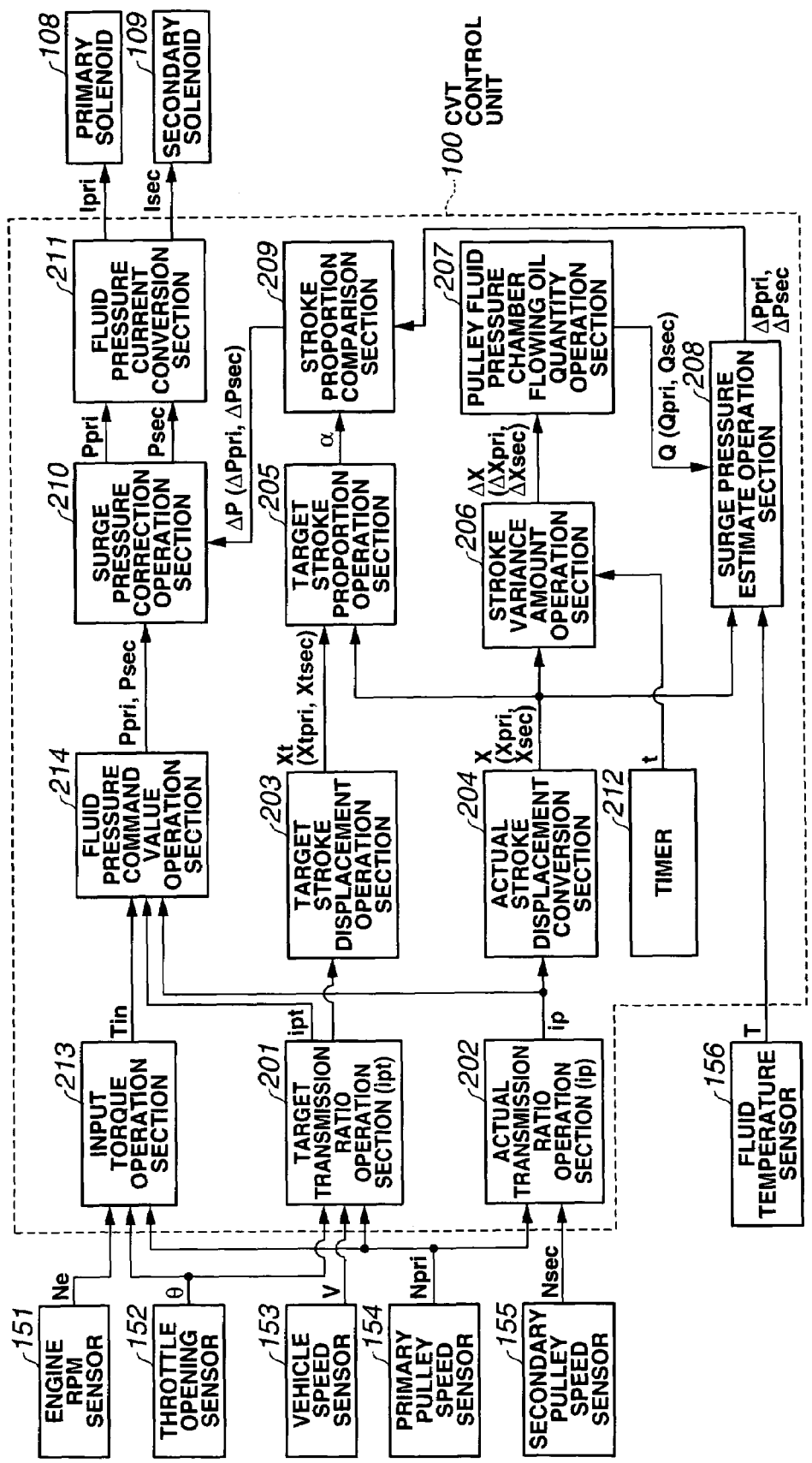
FIG. 2 is a system diagram of a control system in a control unit (CVT control unit) according an embodiment.
Figure 3:
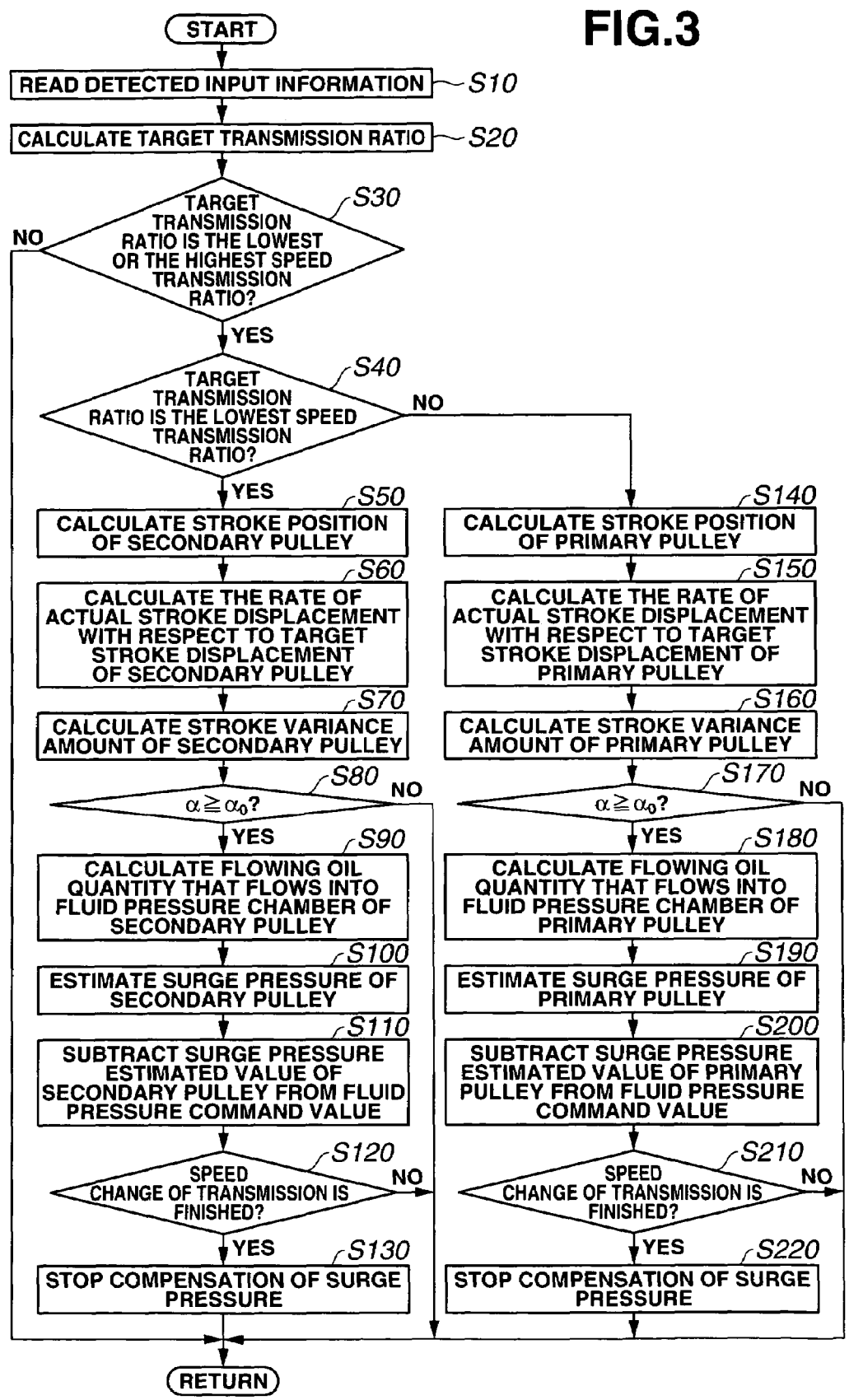
FIG. 3 is a flow chart of control in the CVT control unit according an embodiment.

A first embodiment of the present invention will be explained below with reference to FIGS. 1 to 3, which are for explanation of a hydraulic control apparatus of a belt-drive CVT. FIG. 1 illustrates a schematic system diagram of a vehicle that mounts thereon the hydraulic control apparatus of the belt-drive CVT. FIG. 2 illustrates a diagram of a control system in a control unit (a CVT control unit). FIG. 3 illustrates a flow chart of control in the CVT control unit.

As shown in FIG. 1, power of an engine 10 is transmitted to a belt-drive CVT (continuously variable transmission) 300 through a torque converter 20 and a forward and backward clutch 30. CVT 300 employs a primary pulley 310 as a drive side pulley, a secondary pulley 320 as a driven side pulley, and a belt wound around the both primary and secondary pulleys 310, 320 or linking primary and secondary pulleys 310, 320. Then, the power is transmitted from primary pulley 310 to secondary pulley 320 via the belt.

Each of the primary pulley 310 (driving pulley or drive side pulley) and secondary pulley 320 (driven pulley or driven side pulley) is independently hydraulic controlled. Primary and secondary pulleys 310 and 320 respectively have a primary slide pulley (a primary movable sheave) 311 and a secondary slide pulley (a secondary movable sheave) 321. These primary and secondary slide pulleys 311, 321 slide or move respectively by fluid pressure or oil pressure. Then, a separation between the two sides of each pulley (or a V-shaped groove width formed by each pulley) varies. As a result, respective effective rotation radii of the belt running around primary and secondary pulleys 310, 320 independently vary, and thereby changing transmission ratio (pulley ratio, or speed ratio).

CVT 300 further employs an oil pump 40, a primary pressure regulating valve 71, a secondary pressure regulating valve 72, a primary solenoid (a drive or driving side solenoid) 108, a secondary solenoid (a driven side solenoid) 109, and a CVT control unit 100, for changing transmission ratio. Oil pump 40 is a fluid pressure source which supplies oil or fluid to primary pressure regulating valve 71 and secondary pressure regulating valve 72 via a first pressure regulating valve 51, and also supplies oil or fluid to primary solenoid 108 and secondary solenoid 109 via a second pressure regulating valve 52. Primary solenoid 108 and secondary solenoid 109 are solenoid valves, and function as hydraulic actuators. These primary solenoid 108 and secondary solenoid 109 are electrically connected to CVT control unit 100, and controlled by CVT control unit 100. Further, primary and secondary solenoids 108 and 109 are respectively connected to primary and secondary pressure regulating valves 71 and 72, and thus controls each fluid pressure of primary and secondary slide pulleys 311, 321 by way of sending each signal fluid pressure to primary and secondary pressure regulating valves 71 and 72.

Fluid pressure produced by oil pump 40 is regulated to line pressure by first pressure regulating valve 51, and provided for primary and secondary pressure regulating valves 71 and 72. Further, the fluid pressure is regulated to pilot pressure by second pressure regulating valve 52, and provided for primary and secondary solenoids 108 and 109. As mentioned above, CVT control unit 100 controls primary and secondary solenoids 108 and 109, and regulates or adjusts the pilot pressure supplied by second pressure regulating valve 52 to each desired signal fluid pressure, then provides the signal fluid pressure for primary and secondary pressure regulating valves 71 and 72.

Each of the primary pressure regulating valve 71 and secondary pressure regulating valve 72 regulates or adjusts the line pressure based on the signal fluid pressure provided from primary and secondary solenoids 108 and 109, and supplies fluid pressure to each fluid pressure chamber (or fluid chamber) formed behind primary and secondary slide pulleys 311, 321. Primary and secondary slide pulleys 311, 321, therefore, slide or move respectively by the fluid pressure. In this way, the speed change of transmission (ratio-changing) of CVT 300 is attained by way of controlling or setting each displacement position in moving direction of the primary and secondary slide pulleys 311, 321 via the control of primary and secondary solenoids 108 and 109 by CVT control unit 100.

Next, functional configuration of CVT control unit 100 will be explained below with reference to FIG. 2. CVT control unit 100 is electrically connected to the following vehicle information sensors or detection means. That is, CVT control unit 100 is configured so that informational data signals of the vehicle (vehicle information) enter CVT control unit 100 from the vehicle information sensors: an engine rpm sensor 151, a throttle opening sensor 152, a vehicle speed sensor 153, a primary pulley speed sensor (a first rpm detection sensor or means) 154, a secondary pulley speed sensor (a second rpm detection sensor or means) 155, and an oil or a fluid temperature sensor 156. The number of revolutions Ne of engine 10 (simply, an engine speed Ne) and a throttle opening θ are input to CVT control unit 100 from engine rpm sensor 151 and throttle opening sensor 152. A vehicle speed V and the number of revolutions Npri, Nsec of each of the primary and secondary pulleys 310, 320 (simply, a primary pulley speed Npri, a secondary pulley speed Nsec) are input to CVT control unit 100 from vehicle speed sensor 153 and primary and secondary pulley speed sensors 154, 155. A fluid temperature T of working fluid (or operating oil) that is supplied to primary and secondary pulleys 310, 320 is input to CVT control unit 100 from fluid temperature sensor 156.

A fluid pressure control circuit in CVT control unit 100 is formed by the following sections or means, and each of them performs their respective tasks as explained next. A target transmission ratio operation section or means 201, an actual transmission ratio operation section or means 202, a target stroke displacement operation section or means (or a target displacement amount set section or means) 203, an actual stroke displacement conversion section or means (or an actual displacement amount acquisition or acquiring section or means) 204, a target stroke proportion operation section or means 205, a stroke variance or change amount operation section or means 206, a pulley fluid pressure chamber flowing oil (or fluid) quantity operation section or means 207, a surge pressure estimate operation section or means (or a fluid pressure rapidly changing quantity estimate section or means) 208, a stroke proportion comparison section or means 209, a surge pressure correction or compensation operation section or means (or simply, correction or compensation operation section) 210, a fluid pressure current conversion section or means 211, a timer 212, an input torque operation section or means 213, and a fluid pressure command value operation section or means 214.

Input torque operation section 213 is configured to determine or calculate an input torque Tin that is input to CVT 300, based on the engine speed Ne, the throttle opening θ, and the primary pulley speed Npri. Target transmission ratio operation section 201 is configured to set a suitable target transmission ratio "ipt" for the vehicle traveling based on the throttle opening θ as a load of the engine, the vehicle speed V, and the primary pulley speed Npri.

Actual transmission ratio operation section 202 is configured to determine or calculate an actual current transmission ratio "ip" from the primary pulley speed Npri and the secondary pulley speed Nsec. Here, the actual transmission ratio "ip" is determined by the following an arithmetic expression, ip=Npri/Nsec. Fluid pressure command value operation section 214 is configured to determine or calculate fluid pressure command values Ppri, Psec that are provided for primary and secondary pulleys 310, 320, from the target transmission ratio "ipt", the actual transmission ratio "ip", and the input torque Tin. Further, fluid pressure command values Ppri, Psec determined by fluid pressure command value operation section 214 are converted to current values Ipri, Isec (instruction current, or control command value) by fluid pressure current conversion section 211 so as to ensure controlling fluid pressure provided for each pulley, through surge pressure correction operation section 210 (described later). Then, these current values Ipri, Isec are supplied or sent to primary and secondary solenoids 108, 109.

Target stroke displacement operation section (target displacement amount set section) 203 is configured to set or determine or calculate a stroke position (target stroke displacement, or amount of target displacement) Xt (Xtpri, Xtsec) of primary and secondary pulleys 310, 320, corresponding to or appropriate to the target transmission ratio "ipt" set by target transmission ratio operation section 201.

Actual stroke displacement conversion section (actual displacement amount acquisition section, or actual displacement amount detection sensor or section) 204 is configured to determine or calculate an actual stroke displacement (or amount of actual displacement) X (Xpri, Xsec) of primary and secondary pulleys 310, 320 from the actual transmission ratio "ip". Here, the actual stroke displacement X is a stroke displacement from a stroke position at the point of speed-change start to a current stroke position.

In this embodiment, with respect to the stroke positions of primary and secondary pulleys 310, 320, these are determined from the actual transmission ratio "ip", maximum effective rotation radii of each pulley, and angles of the V-shaped groove with respect to vertical axis of each pulley by computation. However, each pulley stroke may actually be measured or detected by a pulley stroke sensor. In this case, actual displacement amount acquisition section 204 functions as a sensor (pulley stroke sensor) too, as vehicle information sensor or detection means. Further, there is a correlation between stroke of primary pulley 310 and stroke of secondary pulley 320. Because of this, there is not a need to measure or detect about both pulleys. That is, by measuring or detecting one of the stroke displacements of primary and secondary pulleys 310, 320, both stroke displacements can be determined.

Target stroke proportion operation section 205 is configured to determine or calculate each rate α of the actual stroke displacement X (Xpri, Xsec) of primary and secondary pulleys 310, 320 with respect to the target stroke displacement Xt (Xtpri, Xtsec). Timer 212 is adapted to measure time "t" from the speed-change start. Stroke variance amount operation section 206 determines or calculates a variance or change amount of stroke ΔX (ΔXpri, ΔXsec) with respect to time (a stroke variance amount ΔX (ΔXpri, ΔXsec)), from the measured time "t" and the actual stroke displacement X (Xpri, Xsec). Here, ΔX=X/t.

Pulley fluid pressure chamber flowing oil quantity operation section 207 determines or calculates actual amount or quantity Qpri, Qsec of inflow working fluid (operating oil) to each pulley or outflow working fluid (operating oil) from each pulley (namely, flowing working fluid or oil quantity Qpri, Qsec), from the stroke variance amount ΔX (ΔXpri, ΔXsec) and each area "A" of primary and secondary slide pulleys 311, 321 in the fluid pressure chambers (Here, Q=ΔX×A). Surge pressure estimate operation section (fluid pressure rapidly changing quantity estimate section) 208 estimates or calculates each surge pressure (fluid pressure rapidly changing amount or quantity) ΔPpri, ΔPsec which occurs when the speed change of transmission has finished, from fluid temperature T of working fluid supplied to primary and secondary pulleys 310, 320, the actual stroke displacement X (Xpri, Xsec), and flowing oil quantity Q (Qpri, Qsec). The detail of this calculation will be described later.

In stroke proportion comparison section 209, a predetermined rate or value $α_0$ for comparison with the rate α of the actual stroke displacement X (in a word, stroke proportion α) is preprogrammed. And stroke proportion comparison section 209 compares the magnitudes of the stroke proportion α determined by target stroke proportion operation section 205 and the predetermined value $α_0$. If $α \geq α_0$ is satisfied, the estimated surge pressures ΔPpri, ΔPsec input from surge pressure estimate operation section 208 to stroke proportion comparison section 209 are input to surge pressure correction operation section 210. While, if $\alpha<\alpha_0$ is satisfied, the $\Delta$Ppri, $\Delta$Psec are not input to surge pressure correction operation section 210.

Regarding the predetermined value $\alpha_0$, if its magnitude is too large, due to mechanical response delay of solenoid and pressure regulating valve, before the fluid pressure of each pulleys actually reaches a corrected fluid pressure command value, the slide pulley suddenly stops by mechanical movement limitation. The surge pressure, therefore, occurs, and an adequate effect of surge pressure suppression can not be obtained. On the other hand, if the magnitude of $\alpha_0$ is too small, before the sudden stop of the slide pulley, the fluid pressure command value for each pulley becomes the corrected fluid pressure command value. As a result, there is a possibility that the target transmission ratio will not be attained. Or, there may arise a delay in the speed change operation of transmission. For this reason, it is preferable that the predetermined value $\alpha_0$ is set to a range between 80 and 85% in consideration of the above.

Surge pressure correction operation section 210 is configured to subtract the estimated surge pressures $\Delta$Ppri, $\Delta$Psec from the fluid pressure command values Ppri, Psec input from fluid pressure command value operation section 214. That is, in this section, the original fluid pressure command values Ppri, Psec are corrected or compensated by the amount of the estimated surge pressure. Then, the corrected fluid pressure command values are sent for primary and secondary solenoids 108 and 109 through fluid pressure current conversion section 211.

With regard to this correction or compensation, when setting the transmission ratio to the minimum ratio (the highest speed) (namely, that in a case where the target transmission ratio "ipt" is the highest speed transmission ratio), surge pressure correction operation section 210 is configured to subtract the estimated surge pressure $\Delta$Ppri of primary pulley 310 from the fluid pressure command value Ppri of primary pulley 310. While, when setting the transmission ratio to the maximum ratio (the lowest speed) (namely, that in a case where the target transmission ratio "ipt" is the lowest speed transmission ratio), surge pressure correction operation section 210 is configured to subtract the estimated surge pressure $\Delta$Psec of secondary pulley 320 from the fluid pressure command value Psec of secondary pulley 320. In this way, even in the case where each of the primary and secondary slide pulleys 311, 321 is mechanically stopped at the end of speed change to a limit of speed change (i.e. the highest or lowest speed), the fluid pressure command value of the pulley to which the working fluid is supplied is corrected by the amount of the estimated surge pressure by way of the subtraction compensation. Accordingly, generation of overshoot of the fluid pressure, caused by excess surge pressure, can be prevented.

Next, the estimating operation or calculation of surge pressure for the case of changing the transmission ratio to the minimum ratio (the highest speed) in surge pressure estimate operation section 208 will be explained below. In the case where the target transmission ratio "ipt" is the highest speed transmission ratio, surge pressure estimate operation section 208 estimates or calculates the estimated value of the surge pressure generating at primary pulley 310 near the finish of speed change of transmission. While in the case where the target transmission ratio "ipt" is the lowest speed transmission ratio, surge pressure estimate operation section 208 estimates or calculates the estimated value of the surge pressure generating at secondary pulley 320 near the finish of speed change. In this explanation, since the target transmission ratio "ipt" is the highest speed transmission ratio, surge pressure estimate operation section 208 calculates the estimated value $\Delta$Ppri of the surge pressure generating at primary pulley 310 on the basis of the actual stroke displacement Xpri of primary pulley 310, the fluid temperature T, and the flowing oil quantity Qpri of primary pulley 310, each of which is input to surge pressure estimate operation section 208 from actual stroke displacement conversion section 204, fluid temperature sensor 156, and pulley fluid pressure chamber flowing oil quantity operation section 207.

Figure 4:
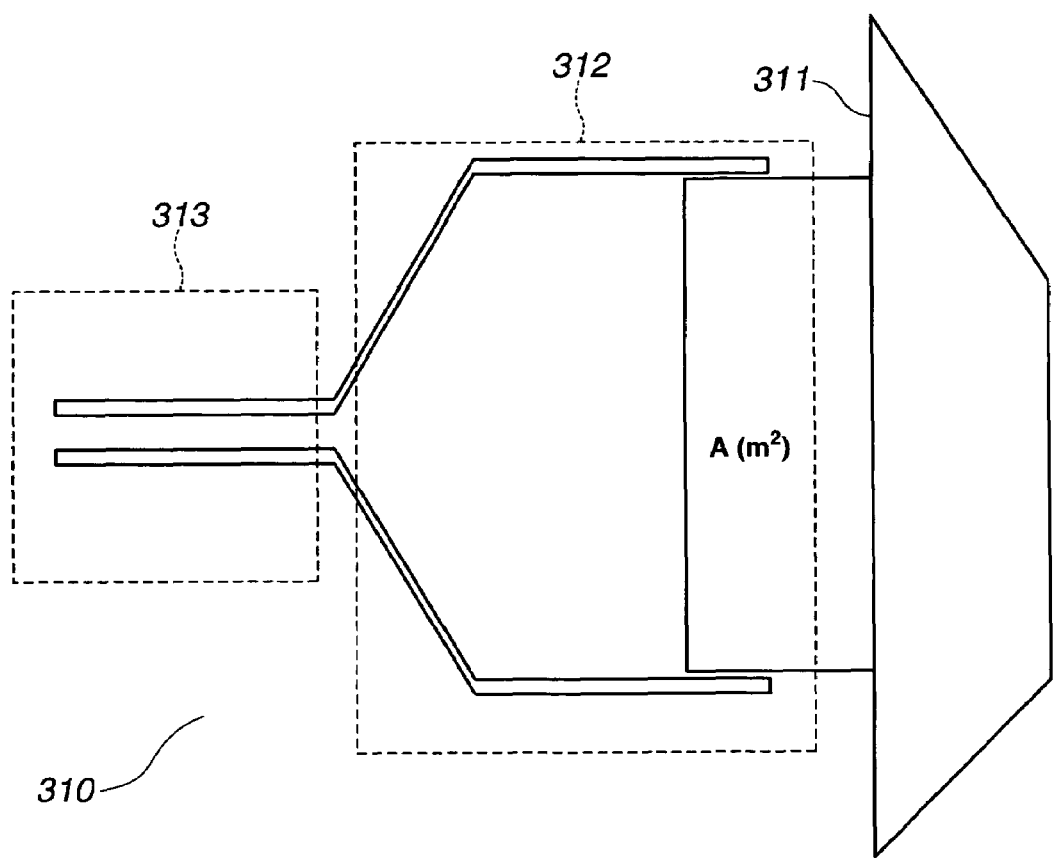
FIG. 4 is a simplified diagram showing a structure of a fluid pressure chamber of a primary pulley (drive side pulley) according an embodiment.
Figure 5:
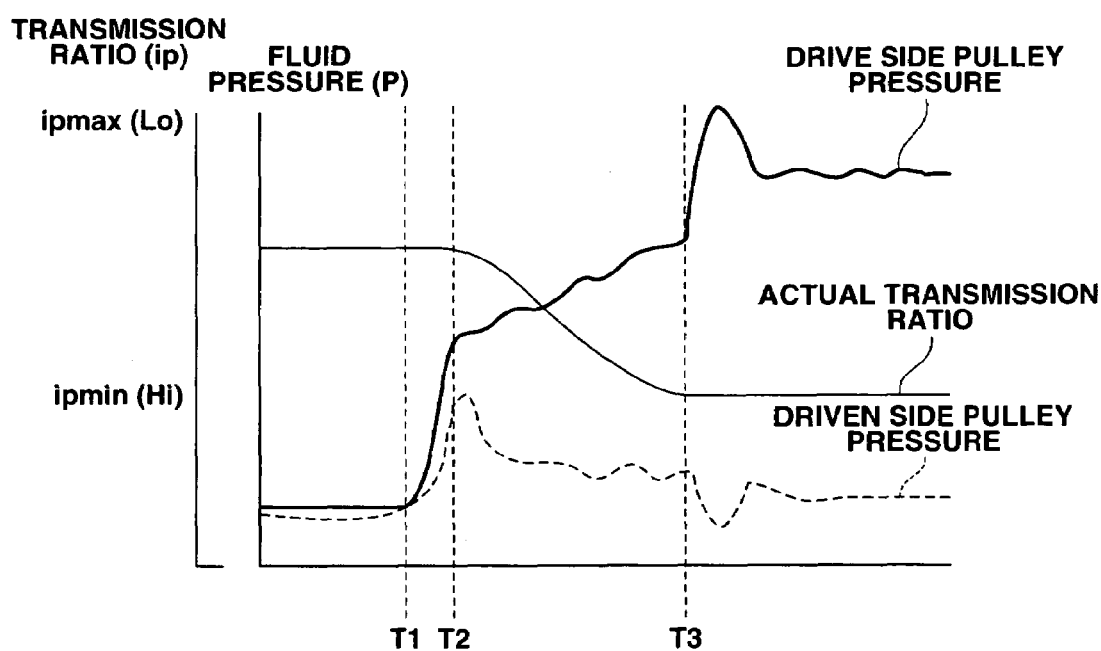
FIG. 5 is a graph showing an example of variations in fluid pressure of drive and driven side pulleys and an actual transmission ratio with time in a case where the transmission ratio is set to minimum (highest speed) in a related art.

FIG. 4 is a simplified diagram showing a structure of the fluid pressure chamber of primary pulley 310. As can be seen in FIG. 4, the fluid pressure chamber of primary pulley 310 is formed from primary slide pulley 311, a cylinder portion 312, and a hydraulic circuit portion 313. Here, an amount of working fluid that inflows to cylinder portion 312 from hydraulic circuit portion 313 at the speed change operation is symbolized by Qin. An amount of working fluid in cylinder portion 312 which flows into a space or portion that appears due to an increase of volume of cylinder portion 312 by pushing primary slide pulley 311 is symbolized by Qout.

Further, the volume of the cylinder is V, fluid pressure is P, modulus of volume elasticity of the working fluid is K. Modulus of volume elasticity K is a constant that is defined as $$K=-V\cdot dp/dv$$

and "dv" changes depending on the fluid temperature. "dp" is a rate of rise of fluid pressure of cylinder portion 312 (an increase amount of fluid pressure at infinitesimal time intervals). Increase amount of fluid pressure at infinitesimal time intervals "dp" can be represented by the following expression in consideration of the volume elasticity modulus for change amount of the working fluid in cylinder portion 312.

$$dp=(K/V)\cdot(Q\text{in}-Q\text{out}) \quad (A)$$

Fluid pressure $\Delta$Ppri which generates by inflow of the working fluid to cylinder portion 312 at the speed change is represented by the following expression, by integrating both sides of the above expression (A).

$$\Delta Ppri=(K/V)\cdot\int(Q\text{in}-Q\text{out})dt \quad (B)$$

When primary slide pulley 311 suddenly stops at close to the end of speed change of transmission, because of no displacement of primary slide pulley 311, the working fluid amount Qout flowing into the space that appears by pushing primary slide pulley 311 becomes 0 (zero). Here, time period in which the working fluid inflows into cylinder portion 312 after primary slide pulley 311 has stopped (namely, a time period in which the surge pressure arises) is symbolized by "$t_0$". Then, fluid pressure of cylinder portion 312 which generates due to the working fluid inflow after the stop of primary slide pulley 311 (namely, the surge pressure) is represented by $$\Delta Ppri=(K/V)\cdot Qpri\cdot t_0 \quad (C)$$

Surge pressure estimate operation section 208 is, therefore, configured to calculate the estimated value of the surge pressure by arithmetic operation of the above expression (C).

In this arithmetic operation, regarding the volume elasticity modulus K of the working fluid, experimental data of volume elasticity modulus versus the fluid temperature T (a relationship between the volume elasticity modulus K of the working fluid and the fluid temperature T) is prepared as mapping data. And by retrieving the volume elasticity modulus K corresponding to a detected fluid temperature from this mapping data base, surge pressure estimate operation section 208 can estimate the surge pressure (the amount of the sudden change in fluid pressure) accurately. In addition, "$t_0$" is a value that was obtained by experiment, and is preprogrammed.

Next, a control flow by the CVT control unit according this embodiment will be explained below with reference to FIG. 3. In CVT control unit 100, each control at the following steps is executed at a predetermined cycle period.

Firstly, at step S10, input information (engine speed Ne, throttle opening θ, vehicle speed V, each primary and secondary pulley speed Npri, Nsec, and fluid temperature T) detected by sensors (engine rpm sensor 151, throttle opening sensor 152, vehicle speed sensor 153, primary and secondary pulley speed sensors 154, 155, and fluid temperature sensor 156) is read at CVT control unit 100. At step S20, target transmission ratio operation section 201 calculates the target transmission ratio "ipt" based on the throttle opening θ, the vehicle speed V, and the primary pulley speed Npri, each of which is input from throttle opening sensor 152, vehicle speed sensor 153, and primary pulley speed sensor 154. On calculating the target transmission ratio "ipt" in target transmission ratio operation section 201, target stroke displacement operation section 203 calculates the target stroke displacement Xt (Xtpri, Xtsec) of primary and secondary pulleys 310, 320, needed to achieve the target transmission ratio.

At step S30, a check is made to determine whether the calculated target transmission ratio "ipt" is the highest speed transmission ratio or the lowest speed transmission ratio. If the calculated target transmission ratio "ipt" is neither the highest speed transmission ratio nor the lowest speed transmission ratio, the flow is terminated without calculation of compensation amount of the fluid pressure command value, which is determined at the following steps. The reason is that primary slide pulley 311 or secondary slide pulley 321 are not mechanically stopped at the end of speed change in this case, and the excess surge pressure does not generate.

If the calculated target transmission ratio "ipt" is the highest speed transmission ratio or the lowest speed transmission ratio, since the generation of excess surge pressure is expected, the routine proceeds from step S30 to step S40. At step S40, a check is made to determine whether or not the target transmission ratio "ipt" is the lowest speed transmission ratio. When the target transmission ratio "ipt" is the lowest speed transmission ratio, correction or compensation of the fluid pressure command value Psec for secondary pulley 320 is made. While, when the target transmission ratio "ipt" is the highest speed transmission ratio, correction or compensation of the fluid pressure command value Ppri for primary pulley. 310 is made. Because, in the case of the lowest speed transmission ratio, secondary pulley 320 is provided with the fluid pressure (or working fluid) for its stroke displacement to obtain the target transmission ratio, then the overshoot of fluid pressure, caused by surge pressure, generates at secondary pulley 320. Conversely, in the case of the highest speed transmission ratio, primary pulley 310 is provided with the fluid pressure (or working fluid) for its stroke displacement to obtain the target transmission ratio, then the overshoot of fluid pressure, caused by surge pressure, generates at primary pulley 310.

When the target transmission ratio "ipt" is the lowest speed transmission ratio at step S40, the routine proceeds to step S50. At step S50, actual stroke displacement conversion section 204 calculates the stroke position (the actual stroke displacement) Xsec of secondary pulley 320. At step S60, target stroke proportion operation section 205 calculates the rate α of the actual stroke displacement Xsec calculated at step S50 with respect to the target stroke displacement Xtsec calculated at step S20. Here, α=Xsec/Xtsec .

Subsequently, at step S70, stroke variance amount operation section 206 calculates the stroke variance amount ΔXsec of secondary pulley 320 per time. At step S80, stroke proportion comparison section 209 compares the stroke proportion α (i.e. the rate of the actual stroke displacement with respect to the target stroke displacement ) calculated at step S60 and the predetermined value $α_0$. When $α<α_0$, the flow is terminated and read the informational signal (input information) of each sensor again, because of the following reason: if correcting the fluid pressure command value Psec by way of the subtraction compensation during the speed change, there may arise the delay in the speed change operation of transmission. Thus, the compensation is not made until the stroke proportion a has reached the predetermined value $α_0$. (Or conversely, the compensation is executed at a time when the stroke proportion α has reached $α_0$, as described next.)

While, when $α≧α_0$, at step S80, even if the fluid pressure command value Psec is corrected by way of the subtraction compensation by the amount of the estimated surge pressure ΔPsec which is calculated at the following steps, the CVT control unit judges that the speed change operation will be able to be completed without the delay or a hitch. Then, in this case, the routine proceeds from step S80 to step S90. At step S90, pulley fluid pressure chamber flowing oil quantity operation section 207 calculates the flowing oil quantity Qsec that flows into secondary pulley 320.

At step S100, surge pressure estimate operation section 208 estimates or calculates the estimated value ΔPsec of the surge pressure occurring at close to the end of speed change, on the basis of the flowing oil quantity Qsec calculated at step S90, the actual stroke displacement Xsec calculated at step S50, and the volume elasticity modulus K of the working fluid, which is determined by the fluid temperature T.

Afterwards, at step S110, the subtraction compensation is made in surge pressure correction operation section 210. That is, surge pressure correction operation section 210 subtracts the surge pressure estimated value (fluid pressure compensation value) ΔPsec calculated at step S100 from the fluid pressure command value Psec which is determined by fluid pressure command value operation section 214 based on the target transmission ratio "ipt", the actual transmission ratio "ip", and the input torque Tin. Then, the corrected fluid pressure command value is sent to secondary solenoid 109 after converting to current (fluid pressure command value instruction current) by fluid pressure current conversion section 211, and thereby controls the fluid pressure provided for secondary pulley 320.

At step S120, a check is made to determine whether or not the speed change of transmission is finished. That is, CVT control unit 100 judges whether the actual transmission ratio reaches the target transmission ratio. When judging that the actual transmission ratio "ip" reaches the target transmission ratio "ipt" and the speed change is finished, the subtraction compensation of the surge pressure estimated value ΔPsec, executed at step S110, is stopped or canceled (at step S130). While, when judging that the speed change has not been finished yet, the flow exits from main flow (and returns to step S90), and the calculation of the surge pressure estimated value and the subtraction compensation of fluid pressure command value continue being made until the speed change operation is finished.

Returning to step S40, when the target transmission ratio "ipt" is the highest speed transmission ratio (that is, the answer is "No"), since the overshoot of the fluid pressure, caused by the excess surge pressure, occurs at primary pulley 310 at close to the end of speed change, the routine proceeds from step S40 to step S140.

At step S140, actual stroke displacement conversion section 204 calculates the stroke position (the actual stroke displacement) Xpri of primary pulley 310. At step S150, target stroke proportion operation section 205 calculates the rate $\alpha$ of the actual stroke displacement Xpri calculated at step S140 with respect to the target stroke displacement Xtpri calculated at step S20. Here, $\alpha$=Xpri/Xtpri.

Subsequently, at step S160, stroke variance amount operation section 206 calculates the stroke variance amount $\Delta$Xpri of primary pulley 310 per time. At step S170, stroke proportion comparison section 209 compares the stroke proportion $\alpha$ (i.e. the rate of the actual stroke displacement with respect to the target stroke displacement ) calculated at step S150 and the predetermined value $\alpha_0$. When $\alpha<\alpha_0$, the flow is terminated and read the informational signal (input information) of each sensor again, because of the following reason: if correcting the fluid pressure command value Ppri by way of the subtraction compensation during the speed change, there may arise the delay in the speed change operation of transmission. Thus, the compensation is not made until the stroke proportion $\alpha$ has reached the predetermined value $\alpha_0$. (Or conversely, the compensation is executed at a time when the stroke proportion a has reached $\alpha_0$, as described next.)

While, when $\alpha \geq \alpha_0$, at step S170, even if the fluid pressure command value Ppri is corrected by way of the subtraction compensation by the amount of the estimated surge pressure $\Delta$Ppri which is calculated at the following steps, the CVT control unit judges that the speed change operation will be able to be completed without the delay or a hitch. Then, in this case, the routine proceeds from step S170 to step S180. At step S180, pulley fluid pressure chamber flowing oil quantity operation section 207 calculates the flowing oil quantity Qpri that flows into primary pulley 310.

At step S190, surge pressure estimate operation section 208 estimates or calculates the estimated value $\Delta$Ppri of the surge pressure occurring at close to the end of speed change, on the basis of the flowing oil quantity Qpri calculated at step S180, the actual stroke displacement Xpri calculated at step S140, and the volume elasticity modulus K of the working fluid, which is determined by the fluid temperature T.

Afterwards, at step S200, the subtraction compensation is made in surge pressure correction operation section 210. That is, surge pressure correction operation section 210 subtracts the surge pressure estimated value (fluid pressure compensation value) $\Delta$Ppri calculated at step S190 from the fluid pressure command value Ppri which is determined by fluid pressure command value operation section 214 based on the target transmission ratio "ipt", the actual transmission ratio "ip", and the input torque Tin. Then, the corrected fluid pressure command value is sent to primary solenoid 108 after converting to current (fluid pressure command value instruction current) by fluid pressure current conversion section 211, and thereby controls the fluid pressure provided for primary pulley 310.

At step S210, a check is made to determine whether or not the speed change of transmission is finished. That is, CVT control unit 100 judges whether the actual transmission ratio reaches the target transmission ratio. When judging that the actual transmission ratio "ip" reaches the target transmission ratio "ipt" and the speed change is finished, the subtraction compensation of the surge pressure estimated value $\Delta$Ppri, executed at step S200, is stopped or canceled (at step S220). While, when judging that the speed change has not been finished yet, the flow exits from main flow (and returns to step S180), and the calculation of the surge pressure estimated value and the subtraction compensation of fluid pressure command value continue being made until the speed change operation is finished.

As explained above, in the hydraulic control apparatus of the belt-drive CVT of vehicle according to the above first embodiment, the fluid pressure command value of the pulley to which the working fluid is supplied is corrected by way of the subtraction compensation, when the transmission ratio is set to the highest or the lowest speed transmission ratio. (That is, when setting the ratio-changing to the highest speed transmission, the fluid pressure command value of the primary pulley is corrected. While, when setting the ratio-changing to the lowest speed transmission, that of the secondary pulley is corrected). It is therefore possible to suppress or avoid the generation of the excess surge pressure, and thus prevent the overshoot of fluid pressure, caused by the surge pressure. As a result, damage to the belt due to the excess surge pressure can be reduced, and life of the belt can be increased. In addition, since the compensation is executed at the time when the stroke proportion $\alpha$ has reached $\alpha_0$, the speed change of transmission can be completed without the delay. As a result, it is possible to ensure good speed change response of transmission.

Next, a second embodiment of the present invention will be explained below. Functional configuration of the CVT control unit of the second embodiment is similar to that of the first embodiment, except for operation of the compensation executed in surge pressure estimate operation section 208 and surge pressure correction operation section 210. Therefore, here, the same reference letters and symbols are used, and only different parts will be explained below.

As described above, in the first embodiment, the surge pressure (that is, the amount of the sudden increase in fluid pressure, or fluid pressure rapidly increasing amount) generated at the pulley to which the working fluid is supplied at the speed change operation is estimated, then the fluid pressure command value is corrected by way of the subtraction compensation. Whereas in the second embodiment, the respective surge pressures (the amount of the sudden change in fluid pressure, or fluid pressure rapidly changing amount) generated at primary pulley 310 and secondary pulley 320 are always estimated at the speed change operation. That is to say, surge pressure estimate operation section 208 calculates always both the surge pressure estimated values $\Delta$Ppri and $\Delta$Psec, generated at the end of speed change, based on the flowing oil quantity Qpri, Qsec, the actual stroke displacement Xpri, Xsec, and the fluid temperature T (or, the volume elasticity modulus K ) of the working fluid that flow into primary pulley 310 and secondary pulley 320. A way or means of calculating the estimated value is the same as that of the first embodiment.

As for surge pressure correction operation section 210, the section 210 is configured to correct the original fluid pressure command value Ppri and Psec input from fluid pressure command value operation section 214 by the respective amount of $\Delta$Ppri and $\Delta$Psec by the compensation, regardless of whether the target transmission ratio "ipt" is the highest or the lowest speed transmission ratio when the target transmission ratio "ipt" is one of the highest speed transmission ratio or the lowest speed transmission ratio. And the corrected fluid pressure command values are sent to primary and secondary solenoids 108, 109 after converting to current (fluid pressure command value instruction current) by fluid pressure current conversion section 211.

With respect to the compensation, if the target transmission ratio "ipt" is the highest speed transmission ratio, surge pressure correction operation section 210 is configured to subtract the estimated surge pressure ΔPpri of primary pulley 310 from the fluid pressure command value Ppri of primary pulley 310, and add the surge pressure estimated value ΔPsec (in this case, the estimated value of the amount of sudden decrease in fluid pressure or fluid pressure rapidly decreasing amount) of secondary pulley 320 to the fluid pressure command value Psec of secondary pulley 320. Conversely, if the target transmission ratio "ipt" is the lowest speed transmission ratio, surge pressure correction operation section 210 is configured to add the estimated surge pressure ΔPpri (in this case, the estimated value of the amount of sudden decrease in fluid pressure or fluid pressure rapidly decreasing amount) of primary pulley 310 to the fluid pressure command value Ppri of primary pulley 310, and subtract the surge pressure estimated value ΔPsec of secondary pulley 320 from the fluid pressure command value Psec of secondary pulley 320.

By way of these compensations (the subtraction compensation and the addition compensation), even if each of the primary and secondary slide pulleys 311, 321 is mechanically stopped at the end of speed change, the fluid pressure command value of the pulley to which the working fluid is supplied is corrected by way of the subtraction compensation. And therefore, the generation of the excess surge pressure can be prevented. On the other hand, the fluid pressure command value of the pulley, out of which the working fluid flows, is corrected by way of the above addition compensation. And thus, the sudden decrease of fluid pressure can be avoided or suppressed, despite the mechanical stop of the slide pulley at the end of speed change.

In the second embodiment, the above calculation (or the estimate) and the compensations are executed only during a time period until the actual stroke displacement has reached the target stroke displacement after the stroke proportion α has reached $\alpha_0$, at a predetermined cycle period, same as the first embodiment. This prevents undesired compensation of the fluid pressure. Further, the respective compensations of the surge pressure for primary and secondary pulleys 310, 320 are always made at a time. Because of this, in surge pressure correction operation section 210, subtraction or addition compensation amount of the fluid pressure command value may be set to be rather small, by multiplying the surge pressure estimated values ΔPpri and ΔPsec calculated in surge pressure estimate operation section 208 by each proper correction factor.

As explained above, in the hydraulic control apparatus of the belt-drive CVT of vehicle according to the above second embodiment, the fluid pressure command value of the pulley to which the working fluid is supplied is corrected by way of the subtraction compensation, when the transmission ratio is set to the highest or the lowest speed transmission ratio. It is therefore possible to suppress or avoid the generation of the excess surge pressure. Additionally, the fluid pressure command value of the pulley, out of which the working fluid flows, is corrected by way of the addition compensation. Therefore, the sudden decrease of fluid pressure or rapidly decreasing fluid pressure (also, an undershoot caused by this sudden decrease of fluid pressure) can be avoided, despite the mechanical stop of the slide pulley at the end of speed change. Accordingly, damage to the belt due to the excess surge pressure can be reduced, and life of the belt can be increased. Further, it is possible to prevent the occurrence of belt slip, caused by reduction of grasping force which grasps or presses the belt by the fluid pressure. And stable speed change control can be achieved.

Although the invention has been described above by reference to certain embodiments of the invention, the invention is not limited to the embodiments described above. For instance, in the embodiments, with respect to the actual stroke displacement X (Xpri, Xsec) of primary and secondary pulleys 310, 320, it is calculated based on the actual transmission ratio "ip". However, a way of determining or detecting of the actual stroke displacement X (Xpri, Xsec) is not limited to this, these Xpri, Xsec may be directly detected by a sensor such as the pulley stroke sensor.

Furthermore, with respect to the predetermined value $\alpha_0$ programmed in stroke proportion comparison section 209, it is set to the range between 80 and 85% in the embodiments. However, it is not limited to this range, the predetermined value $\alpha_0$ should be set to an appropriate range suitable for the way of detection of the actual stroke displacement X (Xpri, Xsec). That is, the predetermined value $\alpha_0$ is set to a value or range so that the speed change can be completely finished even when the fluid pressure command value is corrected by the subtraction compensation. In more detail, the predetermined value $\alpha_0$ is determined in consideration of calculating time of the surge pressure, determining time of the actual stroke displacement, and mechanical response delay in regulation of the supply fluid pressure regulated to the corrected fluid pressure command value by way of the subtraction compensation by the primary or secondary pressure regulating valve, etc. Therefore, for example, in the case where the actual stroke displacement X (Xpri, Xsec) is directly detected by the pulley stroke sensor etc., the detection response of the actual stroke displacement X (Xpri, Xsec) might become enhanced as compared with the case of calculation on the basis of the actual transmission ratio. In this case, if the predetermined value $\alpha_0$ is set to a range, for example, 85 and 90%, the speed change of transmission can be completed without the delay or hitch even when the fluid pressure command value, determined based on the vehicle information, is corrected by the subtraction compensation by the amount of the calculated surge pressure estimated value. As a result, the surge pressure occurring at close to the end of speed change can be prevented. Or, it may be a range between 80 and 90%. In this case, for the same reason as the above, since the compensation is executed after the actual stroke displacement becomes closer to the target stroke displacement, the speed change can be completed without the delay or hitch. Further, by reducing a lower limit of the range (from 85 to 80%), the overshoot or undershoot of fluid pressure, caused by the surge pressure, can be adequately avoided.

This application is based on a prior Japanese Patent Application No. 2005-259205 filed on Sep. 7, 2005. The entire contents of this Japanese Patent Application No. 2005-259205 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A hydraulic control apparatus of a belt-drive CVT for a vehicle, controlling a transmission ratio by changing respective effective rotation radii of a belt, linking driving and driven pulleys, by working fluid pressure, comprising:

vehicle information sensors that detect vehicle information;

hydraulic actuators that adjust each displacement position in moving direction of the driving and driven pulleys, and change the respective effective rotation radii of the belt wound around the driving and driven pulleys in accordance with the working fluid pressure;

a control unit that determines each fluid pressure command value provided for the driving and driven pulleys based on the vehicle information detected by the vehicle information sensors, and controls the hydraulic actuators responsively to each control command value corresponding to the respective fluid pressure command values; the control unit comprising:

an actual displacement amount acquisition section for acquiring an amount of actual displacement of one of the driving and driven pulleys;

a target displacement amount set section for setting an amount of target displacement of one of the driving and driven pulleys based on the vehicle information detected by the vehicle information sensors at a time of speed change to a limit of speed change;

a fluid pressure rapidly changing quantity estimate section for estimating a rapidly changing amount of the working fluid pressure, occurring at close to an end of the speed change, from a flowing working fluid quantity of a fluid chamber of the one pulley, which is obtained from the actual displacement amount of the one of the pulleys acquired by the actual displacement amount acquisition section, and a modulus of volume elasticity of the working fluid, at the speed change; and a correction operation section for correcting the fluid pressure command value by the rapidly changing amount of the working fluid pressure at a time when a rate of the actual displacement amount with respect to the target displacement amount has reached a predetermined rate $\alpha_0$, at the speed change.

2. The hydraulic control apparatus of a belt-drive CVT as claimed in claim 1, wherein:

the vehicle information sensors comprises a fluid temperature sensor that detects a temperature of the working fluid, and the fluid pressure rapidly changing quantity estimate section retrieves the volume elasticity modulus of the working fluid corresponding to the working fluid temperature detected by the fluid temperature sensor, from a mapping data base that records a relationship between the volume elasticity modulus and the working fluid temperature, and estimates the rapidly changing amount of the working fluid pressure based on the retrieved volume elasticity modulus of the working fluid.

3. The hydraulic control apparatus of a belt-drive CVT as claimed in claim 1, wherein:

the predetermined rate $\alpha_0$ is set to a range between 80 and 90%.

4. The hydraulic control apparatus of a belt-drive CVT as claimed in claim 3, wherein:

the vehicle information sensors comprises a first rpm detection sensor and a second rpm detection sensor that detect the number of revolutions of the driving and driven pulleys respectively, the control unit comprises an actual transmission ratio operation section that calculates an actual transmission ratio from both the detected number of revolutions of the driving and driven pulleys, the actual displacement amount acquisition section calculates the actual displacement amount of the pulley from the actual transmission ratio, and the predetermined rate $\alpha$ is set to a range between 80 and 85%.

5. The hydraulic control apparatus of a belt-drive CVT as claimed in claim 3, wherein:

the actual displacement amount acquisition section is an actual displacement amount detection sensor that directly detects the actual displacement amount of the pulley, and the predetermined rate $\alpha_0$ is set to a range between 85 and 90%.

6. The hydraulic control apparatus of a belt-drive CVT as claimed in claim 1, wherein:

the hydraulic actuators comprise a driving side solenoid that regulates the working fluid pressure provided for the driving pulley, and a driven side solenoid that regulates the working fluid pressure provided for the driven pulley, the control unit controls the driving and driven side solenoids by sending each fluid pressure command value instruction current to the driving and driven side solenoids after converting the fluid pressure command value corrected by the correction operation section to current.

7. The hydraulic control apparatus of a belt-drive CVT as claimed in claim 1, wherein:

when changing the transmission ratio to a lowest speed transmission ratio, the fluid pressure rapidly changing quantity estimate section estimates a fluid pressure rapidly increasing amount, occurring at the driven pulley at close to the end of the speed change as a surge pressure, from a flowing working fluid quantity of the fluid chamber of the driven pulley, which is obtained from the actual displacement amount of the one of the pulleys acquired by the actual displacement amount acquisition section, and the volume elasticity modulus of the working fluid, when changing the transmission ratio to a highest speed transmission ratio, the fluid pressure rapidly changing quantity estimate section estimates a fluid pressure rapidly increasing amount, occurring at the driving pulley at close to the end of the speed change as a surge pressure, from a flowing working fluid quantity of the fluid chamber of the driving pulley, which is obtained from the actual displacement amount of the one of the pulleys acquired by the actual displacement amount acquisition section, and the volume elasticity modulus of the working fluid, and the correction operation section is configured to correct the fluid pressure command value by the fluid pressure rapidly increasing amount estimated by the fluid pressure rapidly changing quantity estimate section by way of a subtraction compensation.

8. The hydraulic control apparatus of a belt-drive CVT as claimed in claim 1, wherein:

when changing the transmission ratio to the lowest speed transmission ratio, the fluid pressure rapidly changing quantity estimate section estimates a fluid pressure rapidly decreasing amount, occurring at the driving pulley at close to the end of the speed change as a surge pressure, from a flowing working fluid quantity of the fluid chamber of the driving pulley, which is obtained from the actual displacement amount of the one of the pulleys acquired by the actual displacement amount acquisition section, and the volume elasticity modulus of the working fluid, when changing the transmission ratio to the highest speed transmission ratio, the fluid pressure rapidly changing quantity estimate section estimates a fluid pressure rapidly decreasing amount, occurring at the driven pulley at close to the end of the speed change as a surge pressure, from a flowing working fluid quantity of the fluid chamber of the driven pulley, which is obtained from the actual displacement amount of the one of the pulleys acquired by the actual displacement amount acquisition section, and the volume elasticity modulus of the working fluid, and the correction operation section is configured to correct the fluid pressure command value by the fluid pressure rapidly decreasing amount estimated by the fluid pressure rapidly changing quantity estimate section by way of an addition compensation.

9. The hydraulic control apparatus of a belt-drive CVT as claimed in claim 8, wherein:

the estimate of the surge pressure and the subtraction and addition compensations, made by the fluid pressure rapidly changing quantity estimate section and the correction operation section, are executed only during a time period until the actual displacement amount has reached the target displacement amount after the rate of the actual displacement amount with respect to the target displacement amount has reached the predetermined rate $\alpha_0$, at a predetermined cycle period.

* * * * *